Patented July 7, 1931

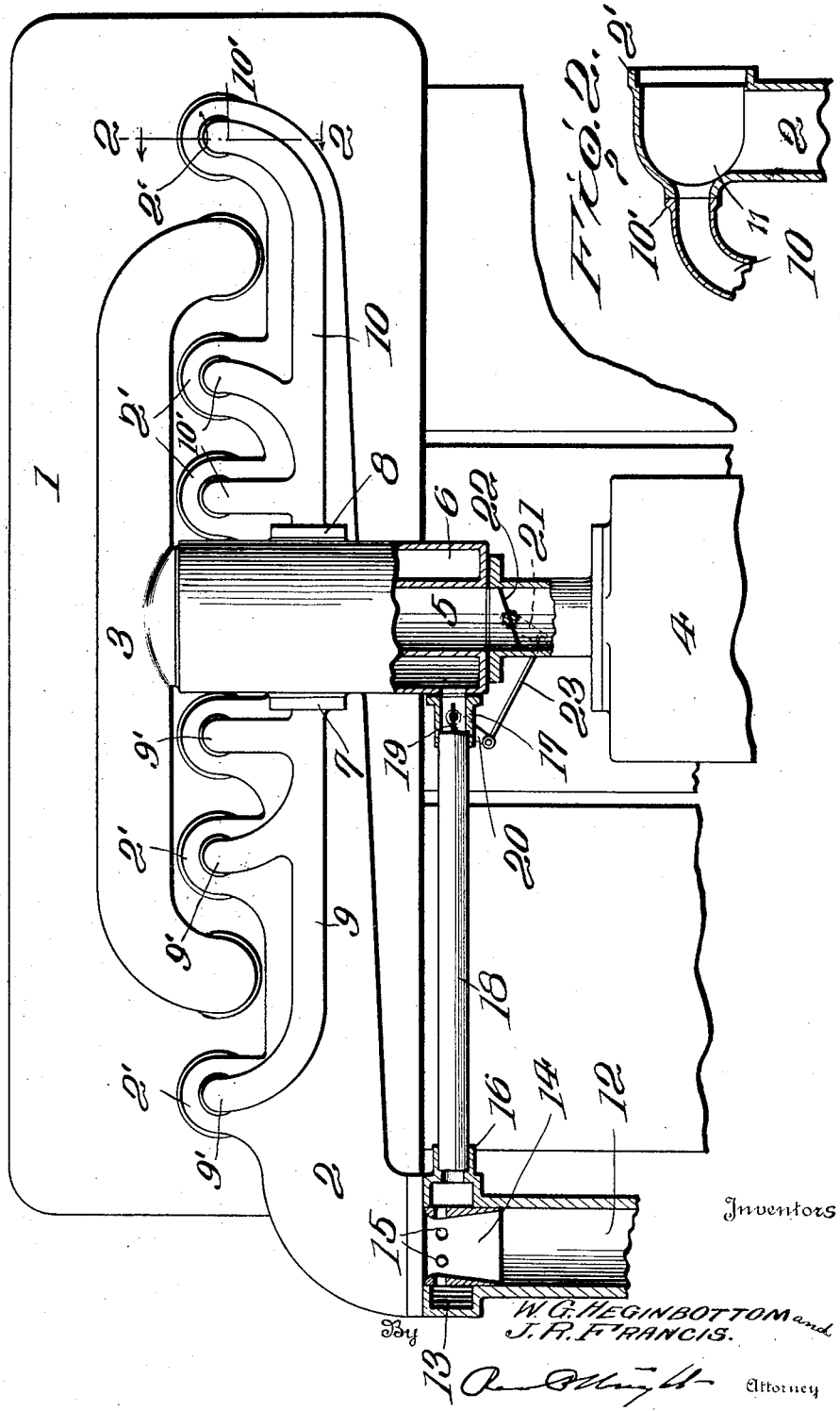

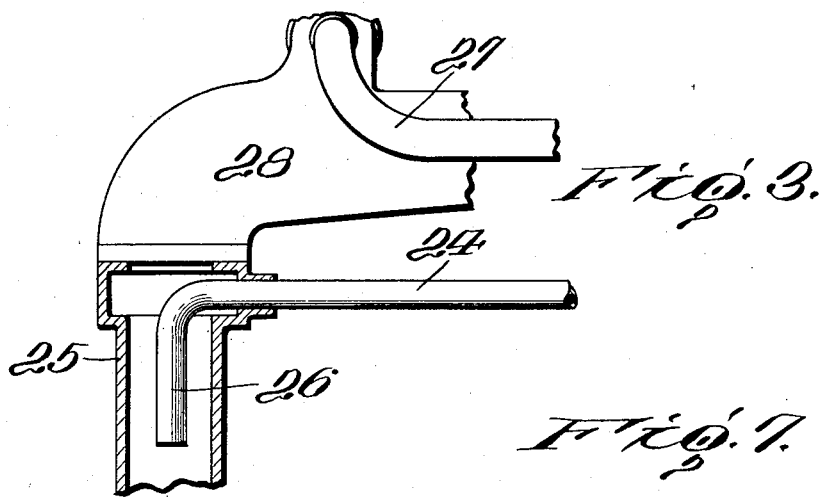
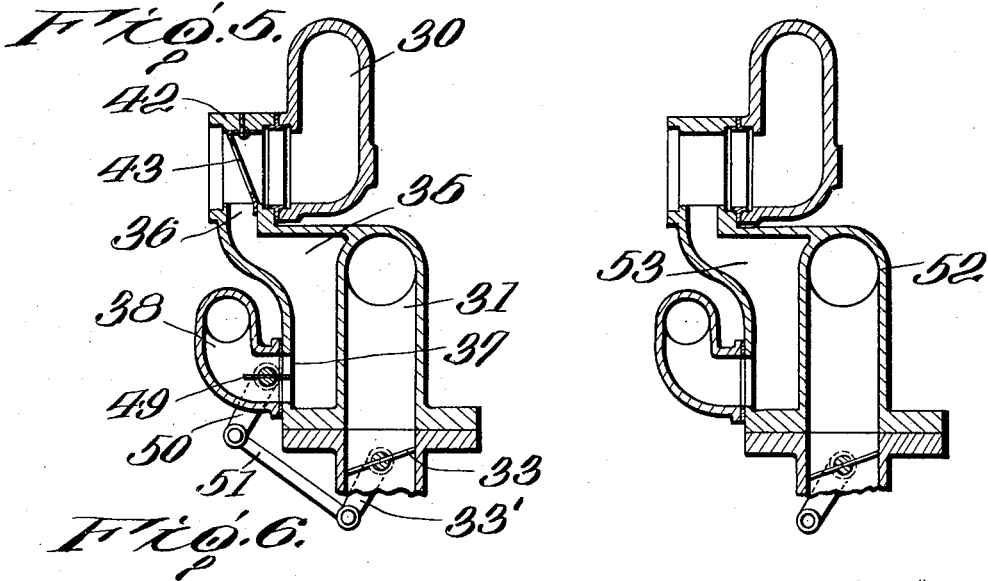
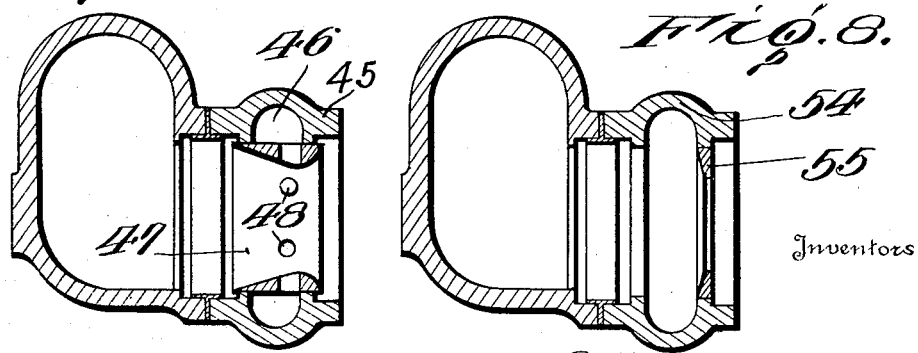

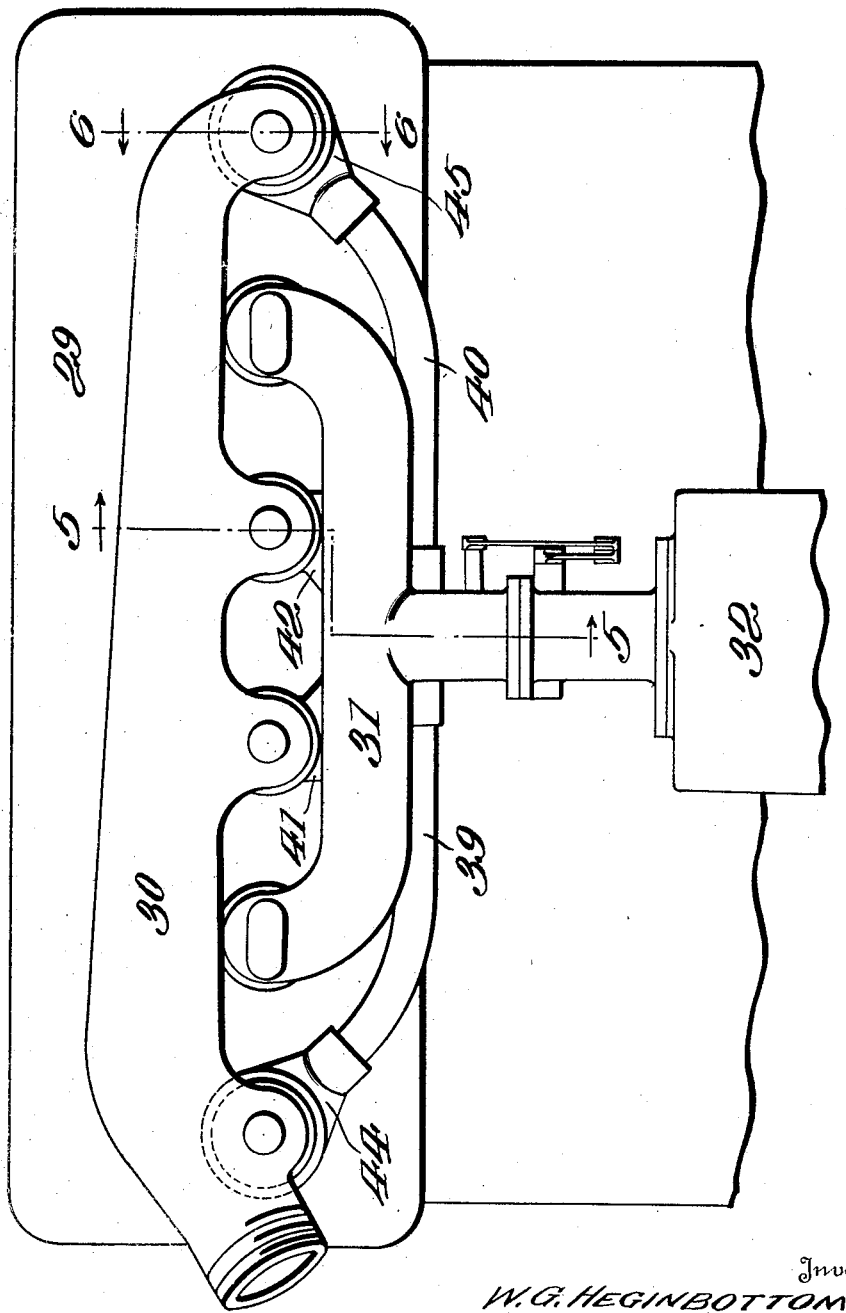

1,812,950

UNITED STATES PATENT OFFICE

WALTER G. HEGINBOTTOM AND JACOB RICHARD FRANCIS, OF FLINT, MICHIGAN; THE UNION INDUSTRIAL TRUST COMPANY AND ANNA HEGINBOTTOM EXECUTORS OF SAID WALTER G. HEGINBOTTOM, DECEASED

HEATING MEANS CONTROL FOR INTAKE MANIFOLDS OF INTERNAL COMBUSTION ENGINES

Application filed May 1, 1923. Serial No. 635,859.

This invention relates to heating means control for intake manifolds of internal combustion engines, the object being to provide means for by-passing the exhaust gases from the exhaust manifold of the internal combustion engine through a heating jacket arranged adjacent the intake manifold and returning said gases to the exhaust line without the use of a damper in the exhaust pipe.

Another and further object of the invention is to provide a heating means control wherein the flow of exhaust gases through the exhaust line creates a suction to draw a certain portion of said gases through the heating chamber of the intake manifold, the volume of exhaust gases being by-passed being controlled by the area of the passage whereby at low speed a greater portion of the exhaust gases from one or more of the cylinders will be by-passed through the heating chamber and as the speed of the motor increases, the volume of exhaust gases will increase to such an extent that the total area of the passage will be insufficient to handle the same and they will pass through the exhaust line in the ordinary manner.

A still further object of the invention is to provide means for baffling the exhaust gases as they are expelled from one or more of the cylinders of the internal combustion engine so as to accelerate the passage of said gases through the heating chamber.

Another object of the invention is to provide the outlet of the heating chamber with a baffle having a connection with the throttle of the charge forming device whereby a positive control of the flow of exhaust gases to the heating chamber can be obtained.

Other and further objects and advantages of the invention will be hereinafter set forth and the novel features thereof defined by the appended claim.

In the drawings,

Figure 1 is a side elevation of an internal combustion engine showing the application of our improved construction of heating means control;

Figure 2 is a section taken on line 2—2 of Figure 1;

Figure 3 is a detail view partly in section showing a modified form of means for creating a suction in the outlet of the heating chamber to cause the exhaust gases to be by-passed therethrough;

Figure 4 is a side elevation of an internal combustion engine showing still another modified form for causing the gases to be by-passed through a heating chamber arranged adjacent the intake manifold;

Figure 5 is a section taken on line 5—5 of Figure 4;

Figure 6 is a section taken on line 6—6 of Figure 4;

Figure 7 is a detail section through a construction as shown in Figure 4 with the baffle and valve omitted; and Figure 8 is a detail section through still another modified form showing an obstruction arranged in the exhaust line to create suction for by-passing the exhaust gases.

In the embodiment of our invention as shown in Figures 1 and 2, 1 indicates an internal combustion engine, 2 the exhaust manifold, 3 the intake manifold and 4 a charge forming device connected thereto, which may be of any of the well known forms of charge forming devices now in use.

The intake manifold as herein shown is provided with a substantially vertical passage 5 surrounded by heating chamber 6 having inlets 7 and 8 to which are connected pipes 9 and 10 provided with branches 9' and 10' which are connected as shown in Figure 2 to outlets 11 formed in the branches 2' of the exhaust manifold 2, whereby a certain portion of the exhaust gases entering the manifold 2 through the branches 2' will be caused to pass into the heating chamber 6 and circulate therethrough as will be hereinafter fully described.

Secured to the end of the exhaust manifold 2 is an exhaust pipe 12 which is enlarged at the junction of the connection therewith to form an annular chamber 13 and disposed within said pipe over said chamber is a Venturi tube 14 provided with openings 15 in communication with the chamber 13. The chamber 13 is provided with an inlet nipple 16 which is connected to an outlet nipple 17 of a heating chamber 6 by a pipe 18 and when the internal combustion engine is in operation the flow of exhaust gases through the Venturi tube creates a suction in the chamber 13 so as to cause the exhaust gases entering the heating chamber to circulate through the heating chamber back into the exhaust pipe 12, the total area of the openings 15 determining the volume of exhaust gases passing through said heating chamber. At low or intermediate speed the greater portion of the exhaust gases are caused to circulate through the heating chamber 6 but as the speed of the motor increases, the volume of exhaust gases likewise increases until the point is reached where the total area of the openings 15 in the Venturi tube 14 is insufficient to take care of the volume of exhaust gases and the gases pass in the normal path of travel through the exhaust line to the muffler.

It will be seen that by increasing and decreasing the size of the openings in the Venturi tube, the proportion of exhaust gases caused to circulate through the heating chamber can be regulated.

In Figure 1 we show additional means for controlling the flow of exhaust gases through the heating chamber by placing a valve 19 in the outlet nipple 17 which is provided with an arm 20 connected to the arm 21 of the throttle valve 22 by a link 23, whereby the valve 19 will be gradually closed as the throttle valve is gradually opened so as to cut off the flow of exhaust gases through the heating chamber as the speed of the motor increases and it is, of course, understood that these valves can be set and connected in any manner desired so as to operate simultaneously or one in advance of the other.

In the embodiment of the invention as shown in Figure 3, the pipe 24 leading from the heating chamber is extended into the exhaust pipe 25 and turned in the direction of flow of exhaust gases as shown at 26 so as to create a suction within the pipe 24 to cause the flow of exhaust gases passing out of the pipe 27 of the exhaust manifold 28 to flow through a heating chamber (not shown). As the exhaust gases flow through the exhaust pipe 25, a suction is created in the pipe 24 so as to cause the exhaust gases to by-pass through a heating chamber and return to the exhaust line.

In Figure 4 we have shown the application of our invention to a four-cylinder internal combustion engine in which 29 indicates an internal combustion engine, 30 an exhaust manifold, 31 an intake manifold and 32 a charge forming device connected thereto which is provided with the usual throttle 33 and we do not wish to limit ourselves to the use of any particular construction of charge forming device as this forms no part of this invention.

The intake manifold 31 has formed integral therewith a heating chamber 35 provided with inlets 36 and an outlet 37 to which is connected a nipple 38 having pipes 39 and 40 connected thereto. Formed integral with the heating chamber of the intake manifold are branches 41 and 42 which are in communication with the heating chamber and with two of the cylinders of the internal combustion engine. These branches are also in communication with the exhaust manifold 30 and are provided with baffles 43 for baffling the exhaust gases passing from the cylinders of the internal combustion engine into the exhaust manifold 30 so as to cause the exhaust gases to pass into the inlets 36 of the heating chamber 35.

The baffles are preferably constructed as herein shown having a central opening in order to allow a certain portion of the exhaust gases to pass in the natural path of travel to baffle a portion of the exhaust gases and to divert them out of their natural path of travel into the heating chamber. Interposed between the exhaust manifold 30 and the internal combustion engine are nipples 44 and 45 provided with annular chambers 46 in which are arranged Venturi tubes 47 provided with openings 48. These nipples are connected respectively to the pipes 39 and 40 so as to create suction in said pipes to cause the exhaust gases to circulate through the heating chamber 35 and while we have shown the use of the baffle, it is not essential as the flow of exhaust gases through the Venturi tube will cause the exhaust gases to be by-passed through the heating chamber and back into the exhaust line and by calibrating the openings of the Venturi tube, the volume of exhaust gases by-passed can be regulated.

The nipple 38 at the junction with the outlet 37 of the heating chamber is provided with a valve 49 provided with an arm 50 which is connected to the arm 33' of the throttle valve 33 by a link 51, whereby the movement of the throttle valve will control the outlet of the heating chamber.

While we have shown the use of a valve at this point, it is not essential as the size of the openings of the Venturi tube will determine the flow of exhaust gases through the heating chamber.

In Figure 7 we have shown a construction of manifold and heating chamber 52 constructed identically as shown in Figures 4 and 5 but have omitted the baffle and the valve controlling the outlet of the heating chamber 53 thereof, but it is, of course, understood that this construction is to be used and connected as clearly illustrated in Figures 4, 5 and 6 so that the exhaust gases will by-pass through the heating chamber 53 by the suction of the exhaust gases passing through the Venturi tube.

In the modification shown in Figure 8, the nipple 54 is placed in the exhaust pipe and is provided with an obstruction 55 to create a suction within the same in order to cause the exhaust gases to flow through a heating chamber when connected up as clearly shown and described in the previous forms of devices, as we have found in practice that by forming a restriction in the exhaust line in advance of a chamber which is connected to a heating chamber, suction will be created so as to cause the exhaust gases to pass from the internal combustion engine to be by-passed through a heating chamber and returned to the main exhaust line.

From the foregoing description it will be seen that we have provided a heating means control for an intake manifold used in connection with an internal combustion engine with means for by-passing a predetermined portion of the exhaust gases through a heating jacket to heat the charge in its passage to the internal combustion engine by creating a suction in the by-pass.

What we claim is:—

The combination with an internal combustion engine having an intake manifold, exhaust manifold and exhaust pipe connected thereto, of a heating chamber arranged to heat the intake manifold provided with spaced inlets, separate pipes connected to said inlets provided with branches extending to the respective exhaust ports of the engine, a connection from said heater to said exhaust pipe, a venturi disposed in said exhaust pipe having openings in communication with said connection for causing a flow of exhaust gases through said heating chamber.

In testimony whereof we hereunto affix our signatures.

WALTER G. HEGINBOTTOM.
JACOB RICHARD FRANCIS.